United States Patent
Hatano (10) Patent No.: US 8,401,490 B2
(45) Date of Patent: Mar. 19, 2013

(54) INFORMATION PROCESSING APPARATUS

(75) Inventor: Ryo Hatano, Kodaira (JP)

(73) Assignee: Kabushiki Kaisha Toshiba (JP)

( * ) Notice: Subject to any disclaimer, the term of this patent is extended or adjusted under 35 U.S.C. 154(b) by 252 days.

(21) Appl. No.: 12/895,690

(22) Filed: Sep. 30, 2010

(65) Prior Publication Data

US 2011/0076963 A1 Mar. 31, 2011

(30) Foreign Application Priority Data

Sep. 30, 2009 (JP) ................................ 2009-228906

(51) Int. Cl.
 *H04B 17/00* (2006.01)
(52) U.S. Cl. ........ 455/67.7; 455/418; 455/419; 370/328
(58) Field of Classification Search .................. 455/418, 455/419, 67.7; 370/328; 709/223, 224
 See application file for complete search history.

(56) References Cited

U.S. PATENT DOCUMENTS

| | | | |
|---|---|---|---|
| 6,882,854 B2 | 4/2005 | Kobayashi | |
| 7,698,382 B2 * | 4/2010 | Amiens | 709/219 |
| 2005/0027888 A1 * | 2/2005 | Juszkiewicz | 709/250 |
| 2005/0160163 A1 * | 7/2005 | Nguyen et al. | 709/223 |
| 2005/0197080 A1 * | 9/2005 | Ulupinar et al. | 455/135 |
| 2012/0036220 A1 * | 2/2012 | Dare et al. | 709/217 |

FOREIGN PATENT DOCUMENTS

| | | |
|---|---|---|
| JP | H11-346230 | 12/1999 |
| JP | 2001-067276 A | 3/2001 |
| JP | 2001-274802 | 10/2001 |

OTHER PUBLICATIONS

Japanese office action for Corresponding Japanese Application No. 2009-228906, dated Feb. 4, 2011, in 9 pages.
Japanese office action for Corresponding Japanese Application No. 2009-228906, dated May 19, 2011, in 4 pages.

* cited by examiner

*Primary Examiner* — Lewis West
(74) *Attorney, Agent, or Firm* — Knobbe, Martens, Olson & Bear LLP (57) ABSTRACT

An information processing apparatus includes: a wireless communication module which performs a wireless communication with a counterpart apparatus; a memory which stores a first application and a plurality of second applications, the first application for performing data communication with the counterpart apparatus through the wireless communication, and the second applications placed in a higher level than the first application; a controller which activates one of the second applications for the counterpart apparatus; and an indicator which makes an indication according to the wireless communication. The controller determines whether the activated one of the second applications is accessible the indicator. The controller controls the indicator by executing the activated second application when the controller determines that the second application is accessible the indicator, and controls the indicator by executing the first application when the controller determines that the second application is not accessible the indicator.

28 Claims, 5 Drawing Sheets

INFORMATION PROCESSING APPARATUS

CROSS REFERENCE TO RELATED APPLICATION(S)

The present disclosure relates to the subject matters contained in Japanese Patent Application No. 2009-228906 filed on Sep. 30, 2009, which are incorporated herein by reference in its entirety.

FIELD

The present invention relates to an information processing apparatus having a wireless communication function.

BACKGROUND

Various techniques have been developed to secure necessary reliability of information processing apparatuses. For example, in systems having a layered structure, when a lower-level information processing apparatus is rendered inoperative, another information processing apparatus performs necessary processing in place of the lower-level information processing apparatus to prevent a higher-level information apparatus from being affected by the above event.

JP-A-2001-67276 discloses an example of proxy processing method. In the related-art processing apparatus for controlling a terminal apparatus, an operation status of the lower-level terminal apparatus is monitored. If the lower-level terminal apparatus is operative, the processing apparatus outputs, to the lower-level terminal apparatus, processing data that is supplied from a higher-level apparatus. On the other hand, if the lower-level terminal apparatus is inoperative, processing data is stored in the processing apparatus temporarily and outputs to the lower-level terminal apparatus when the lower-level terminal apparatus becomes operative. The processing apparatus can respond to the higher-level apparatus normally even if the lower-level terminal apparatus is inoperative, because data is stored temporarily in the processing apparatus.

In recent years, various kinds of data communication are performed through a wireless communication. One method for notifying the user whether a wireless communication is performed is to turn on an indicator that is provided in an information processing apparatus. However, there may occur a case that an activated application cannot control the indicator. As a result, when the wireless communication is performed, indicator notification may be made in one case and may not be made in another case, which would confuse the user. When the indicator notification is not made, the user cannot determine whether or not the wireless communication is performed normally. The reliability of the information apparatus may thus be lowered.

BRIEF DESCRIPTION OF THE DRAWINGS

A general configuration that implements the various feature of the invention will be described with reference to the drawings. The drawings and the associated descriptions are provided to illustrate exemplary embodiments of the invention and not to limit the scope of the invention.

DETAILED DESCRIPTION OF THE EXEMPLARY EMBODIMENTS

Figure 1:
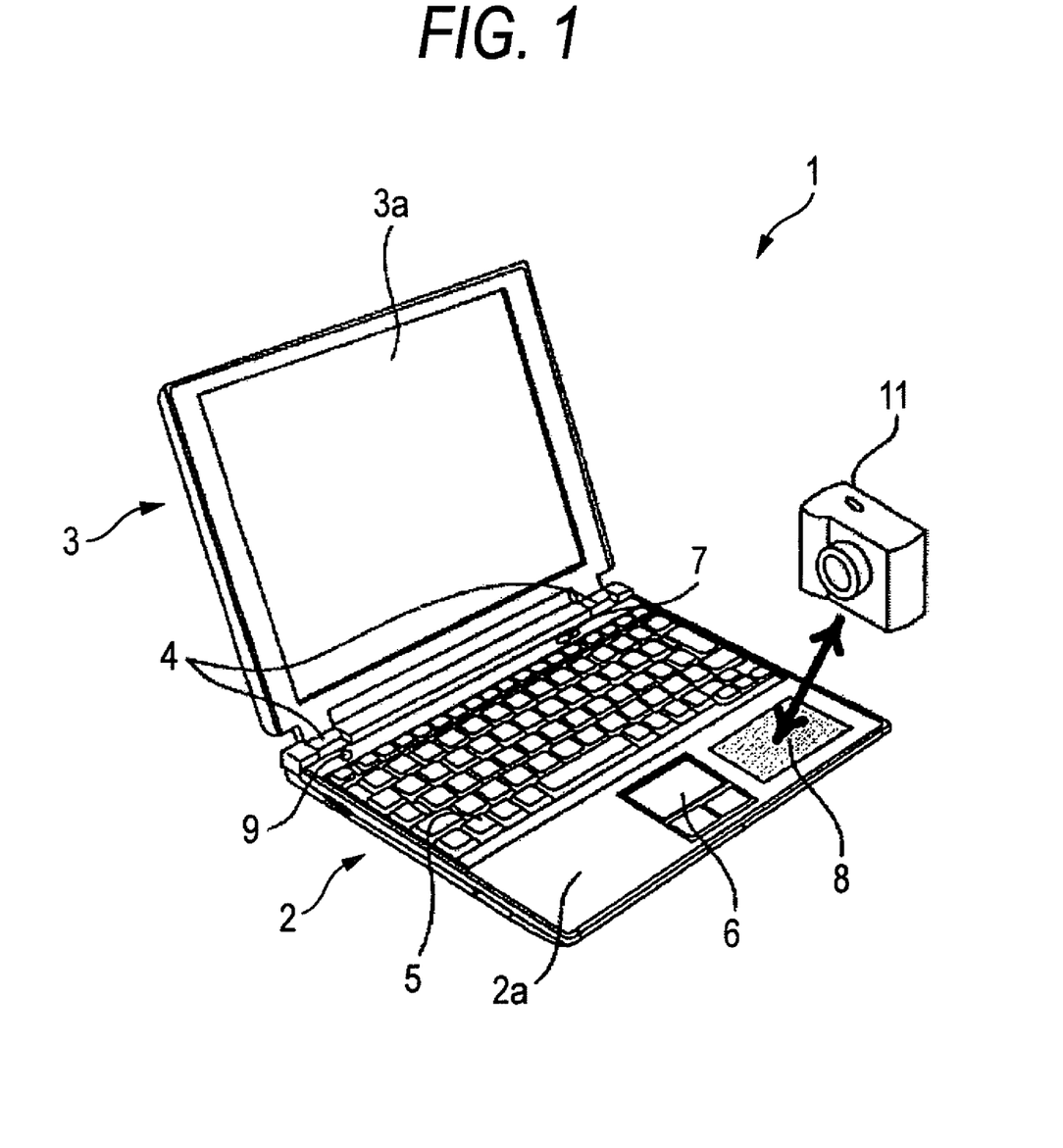
FIG. 1 is a perspective view showing an appearance of a personal computer according to an exemplary embodiment.

A personal computer 1 according to an exemplary embodiment of the present invention, which is an example of information processing apparatus, will be hereinafter described with reference to FIGS. 1 to 5. FIG. 1 is a perspective view showing an appearance of the personal computer 1 according to the exemplary embodiment.

The personal computer 1 is provided with a computer main body 2 and a display unit 3 which are connected to each other by hinges 4 so as to be rotatable with respect to each other. The display unit 3 includes a display device 3a which is a liquid crystal display (LCD), or the like.

The computer main body 2 is provided with a housing 2a, a keyboard 5, a touchscreen 6, a power switch 7, a communication module 8, and an LED 9.

The housing 2a has a thin box shape and houses various electronic components, disc drives, etc. A top face of the housing 2a is provided with input devices such as the keyboard 5 and the touchscreen 6.

The keyboard 5 is an input device that is provided in the top face of the housing 2a. A signal corresponding to an operated key of the keyboard 5 is output to individual modules. A given key of the keyboard 5 is used for making an instruction to start a wireless communication to be performed by the communication module 8.

The touchscreen 6 is a pointing device that is provided in the top face of the housing 2a. A signal corresponding to an operation of the touchscreen 6 is output to individual modules.

The power switch 7 generates a control signal for powering on or off the personal computer 1 in response to an operation by the user.

The communication module 8 is a module for performing a wireless communication with a communication apparatus 11 which is, for example, a digital camera or a cell phone having a wireless communication function. The communication module 8 performs data communication of a movie, music, or the like with the communication apparatus 11 by the wireless communication. The communication distance of the wireless communication is assumed to be several centimeters, and the wireless communication is performed with the communication apparatus 11 that is placed over the communication module 8.

Upon a start of the wireless communication with the communication apparatus 11, the communication module 8 activates an application that is suitable for the communication apparatus 11. The application suitable for the communication apparatus 11 is selected at the time of execution of a first wireless communication and stored as data of a database 103 so as to be correlated with an identifier of the communication apparatus 11. The database 103 is stored in a hard disc drive (HDD) 20, for example.

The LED 9 is an indicator for notifying the user of a communication status of the wireless communication that is performed by the communication module 8. The LED 9 is controlled by an LED-compatible application 101 when the LED-compatible application 101 is activated, and is controlled by a stack 100 when an LED-incompatible application 102 is activated.

The LED 9 is turned on when the communication module 8 starts the wireless communication and is turned off when the communication module 8 completes the wireless communication. The LED 9 may continue to light or blink during executing the wireless communication. Furthermore, the blinking interval may be varied as time elapses from the start to the end of the wireless communication. For example, the blinking interval may be set short at the start of the wireless communication and be increased gradually. Therefore, the user can easily recognize an elapsed time from the start of the wireless communication.

A manner of lighting of the LED 9 when the communication module 8 has completed a connection for the wireless communication may be changed from that when the communication module 8 starts data communication. For example, the communication module 8 may turn on the LED 9 once when the communication module 8 has completed the connection for the wireless communication and may start blinking of the LED 9 when the communication module 8 starts the data communication. Therefore, it is possible to notify the user of an operation status of the wireless communication.

Figure 2:
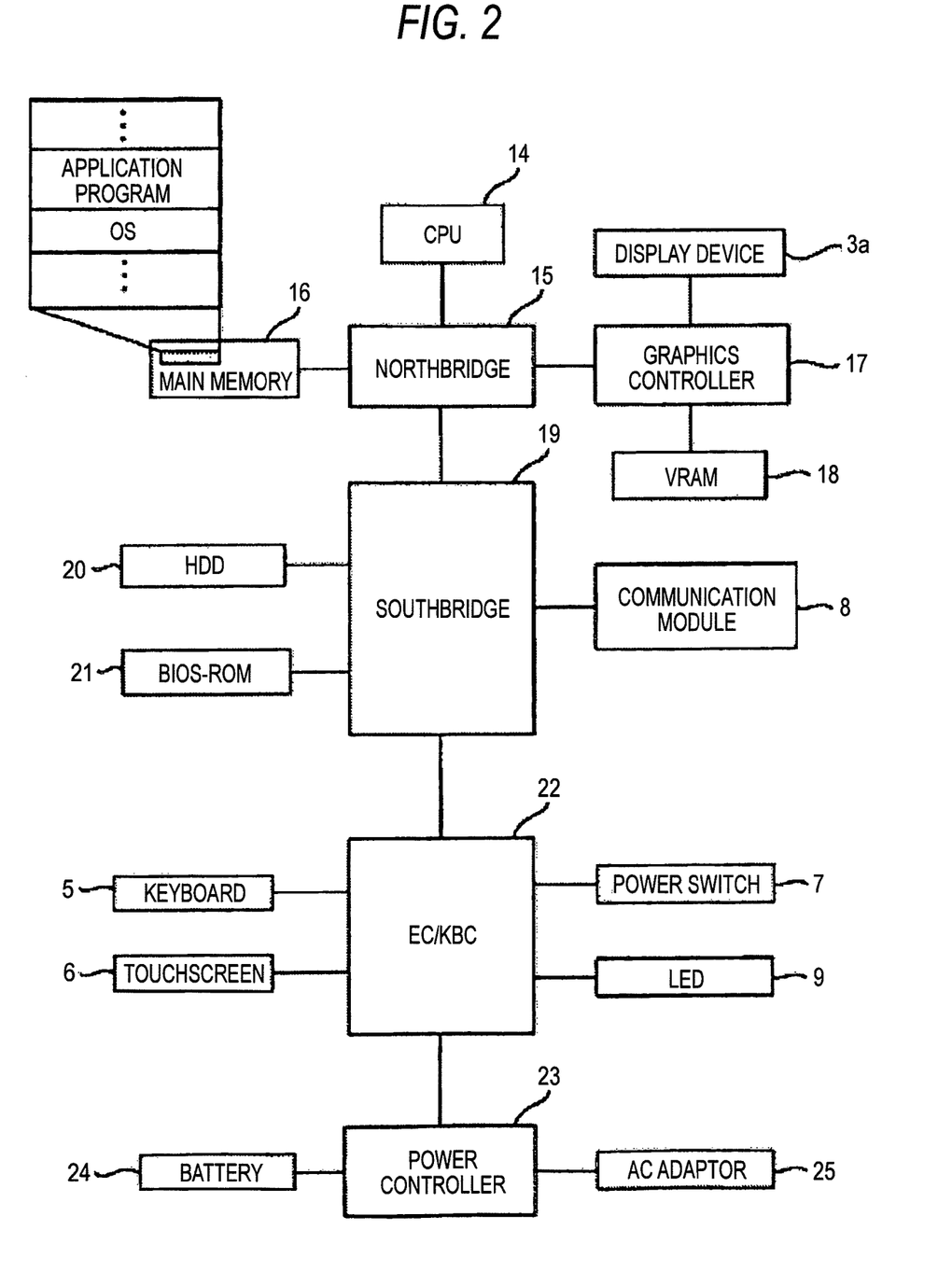
FIG. 2 is a functional block diagram showing the personal computer.

FIG. 2 is a functional block diagram showing the personal computer 1 according to the exemplary embodiment. The personal computer 1 is provided with the display device 3a, the keyboard 5, the touchscreen 6, the power switch 7, the communication module 8, the LED 9, a central processing unit (CPU) 14, a northbridge 15, a main memory 16, a graphics controller 17, a video random access memory (VRAM) 18, a southbridge 19, the HDD 20, a basic input/output system read only memory (BIOS-ROM) 21, an embedded controller/keyboard controller (EC/KBC) 22, a power controller 23, a battery 24, and an alternating current (AC) adaptor 25.

The display device 3a displays a video based on a video signal that is output from the graphics controller 17.

The CPU 14, which is a processor provided for controlling the operations of the personal computer 1, executes an operating system and various application programs that are loaded into the main memory 16 from the HDD 20. The CPU 14 also executes a system BIOS which is stored in the BIOS-ROM 21 after the system BIOS is loaded into the main memory 16. The system BIOS is a program for hardware control.

When the communication module 8 performs the wireless communication, the CPU 14 activates an application that is suitable for the communication apparatus 11. Furthermore, the CPU 14 controls the LED 9 in a manner described later according to the activated application.

The northbridge 15 is a bridge device that connects a local bus of the CPU 14 and the southbridge 19. The northbridge 15 incorporates a memory controller which access-controls the main memory 16. The northbridge 15 also has a function of performing a communication with the graphics controller 17 via an accelerated graphics port (AGP) bus or the like.

The main memory 16 is a working memory for developing the operating system and the various application programs stored in the HDD 20 and the system BIOS stored in the BIOS-ROM 21.

The graphics controller 17 is a display controller for controlling the display device 3a which is used as a display monitor of the personal computer 1. The graphics controller 17 generates a video signal of a display image to be displayed on the display device 3a based on display data stored in the VRAM 18 by the operating system and an application program.

The southbridge 19 controls access to the BIOS-ROM 21 and also controls the disc drives (I/O devices) such as the HDD 20 and an optical disc drive (ODD). In the exemplary embodiment, the communication module 8 which performs the wireless communication with an external apparatus such as the communication apparatus 11 is connected to the southbridge 19.

The HDD 20 is a storage device for storing the operating system, the various application programs, etc. In the exemplary embodiment, an LED I/F application 10, the stack 100, the LED-compatible application 101, and the LED-incompatible application 102 are stored in the HDD 20. The LED-compatible application 101 and the LED-incompatible application 102 are in a higher layer than the stack 100.

The LED I/F application 10 is an application for controlling the LED 9. That is, the LED I/F application 10 generates a control signal for the LED 9 according to a input control signal and outputs the generated control signal to the EC/KBC 22.

The stack 100 divides digital data that is received from the communication module 8 and sends divided data to higher-level applications such as the LED-compatible application 101 and the LED-incompatible application 102 according to the types of the data.

The LED-compatible application 101 and the LED-incompatible application 102 perform various kinds of processing using received digital data. The LED-compatible application 101 is an application that can access the LED I/F application 10 directly. The LED-incompatible application 102 is an application that cannot access the LED I/F application 10 directly.

The BIOS-ROM 21 is a rewritable nonvolatile memory for storing the system BIOS which is a program for hardware control.

The EC/KBC 22 is a one-chip microcomputer for monitoring and controlling various devices (peripheral devices, sensors, a power circuit, etc.) irrespective of the system status of the personal computer 1. That is, the EC/KBC 22 controls the input devices such as the keyboard 5 and the touch panel 6. The EC/KBC 22 also controls the LED 9 according to a control signal that is input from the LED I/F application 10.

When external power is supplied via the AC adaptor 25, the power controller 23 generates system power to be supplied to the individual components (computer main body 2 and display unit 3) of the personal computer 1 using the external power. When the external power is not supplied via the AC adaptor 25, the power controller 23 generates the system power to be supplied to the individual components of the personal computer 1 using the battery 24.

Figure 3:
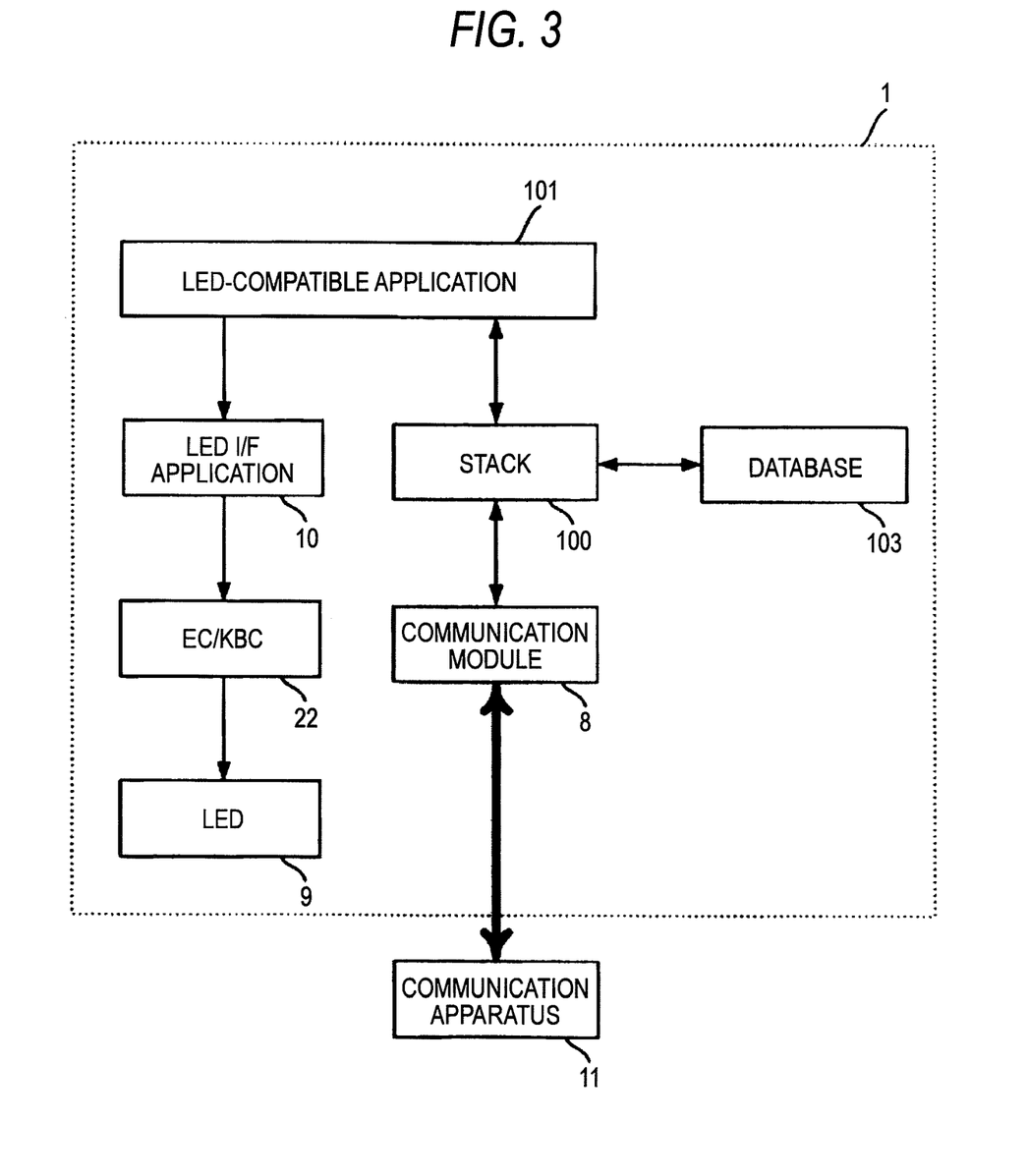
FIG. 3 is a functional block diagram showing an LED control that is performed in the exemplary embodiment when an LED-compatible application is activated.

Next, an LED control that is performed in the exemplary embodiment when the LED-compatible application 101 is activated will be described with reference to FIG. 3. FIG. 3 is a functional block diagram showing an LED control that is performed in the exemplary embodiment when the LED-compatible application 101 is activated. The following description will be directed to a case that the personal computer 1 receives data from the communication apparatus 11.

First, the communication module 8 of the personal computer 1 receives data that is transmitted from the communication apparatus 11. The data received by the communication module 8 is converted into digital data, and the digital data is sent to the stack 100. Based on information indicating the communication apparatus 11 that is included in the received digital data, the CPU 14 determines an application to be activated by referring to the database 103.

For example, if the application to be activated is the LED-compatible application 101, the LED-compatible application 101 sends a control signal directly to the LED I/F application 10 as shown in FIG. 3. When the LED-compatible application 101 sends a control signal to the LED I/F application 10, the LED 9 is turned on according to a start and an end of the wireless communication performed by the communication module 8.

On the other hand, if the application to be activated is the LED-incompatible application 102, the LED-incompatible application 102 cannot directly access the LED I/F application 10. Therefore, unlike in FIG. 3, a control signal cannot be directly sent from the LED-incompatible application 102 of the higher-level application to the LED I/F application 10.

Figure 4:
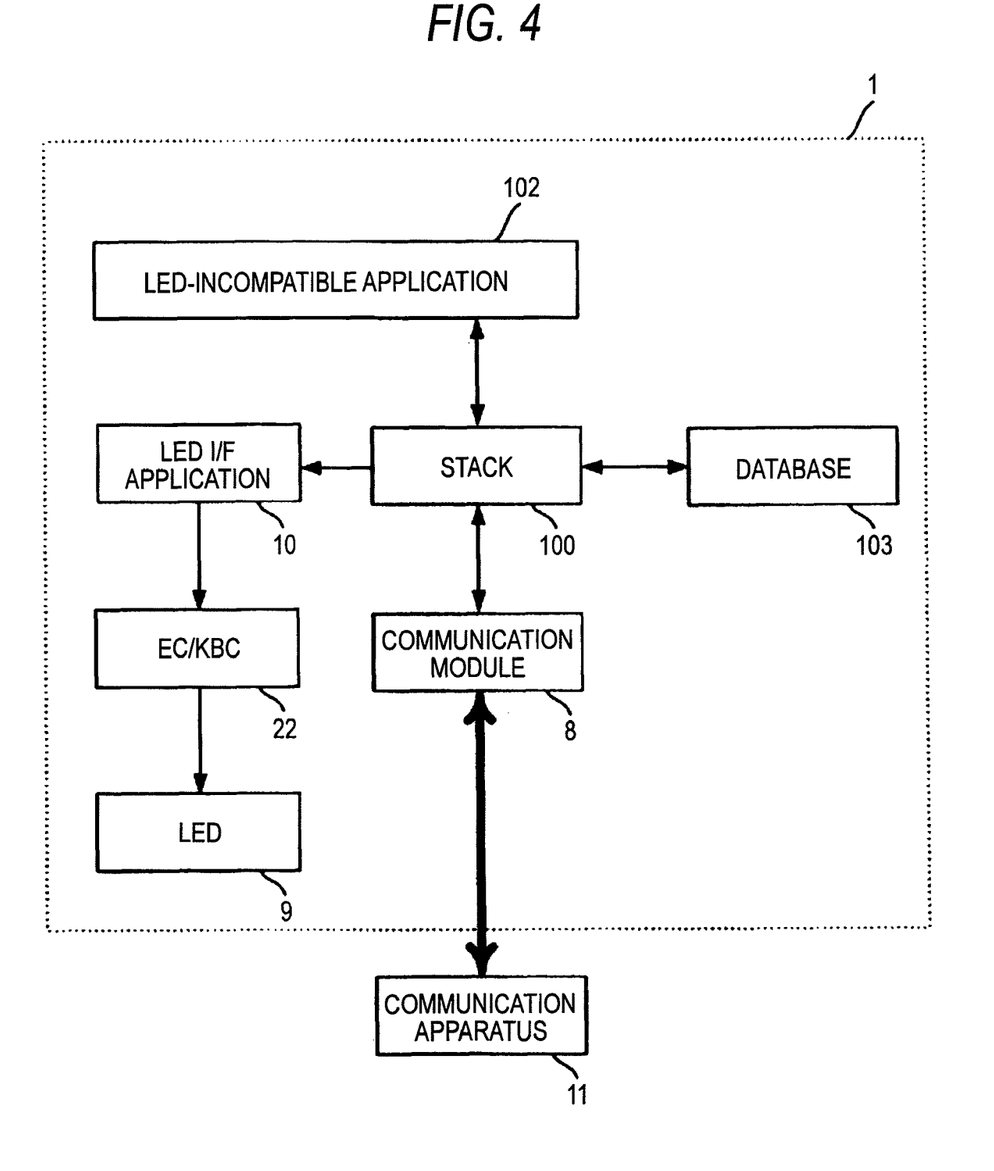
FIG. 4 is a functional block diagram showing an LED control that is performed in the exemplary embodiment when an LED-incompatible application is activated.

Next, an LED control that is performed in the exemplary embodiment when the LED-incompatible application 102 is activated will be described with reference to FIG. 4. FIG. 4 is a functional block diagram showing an LED control when the LED-incompatible application 102 is activated. If the LED-incompatible application 102 is activated, the stack 100 sends a control signal to the LED I/F application 10 as shown in FIG. 4. The stack 100 turns on the LED 9 according to data reception from the communication module 8.

Figure 5:
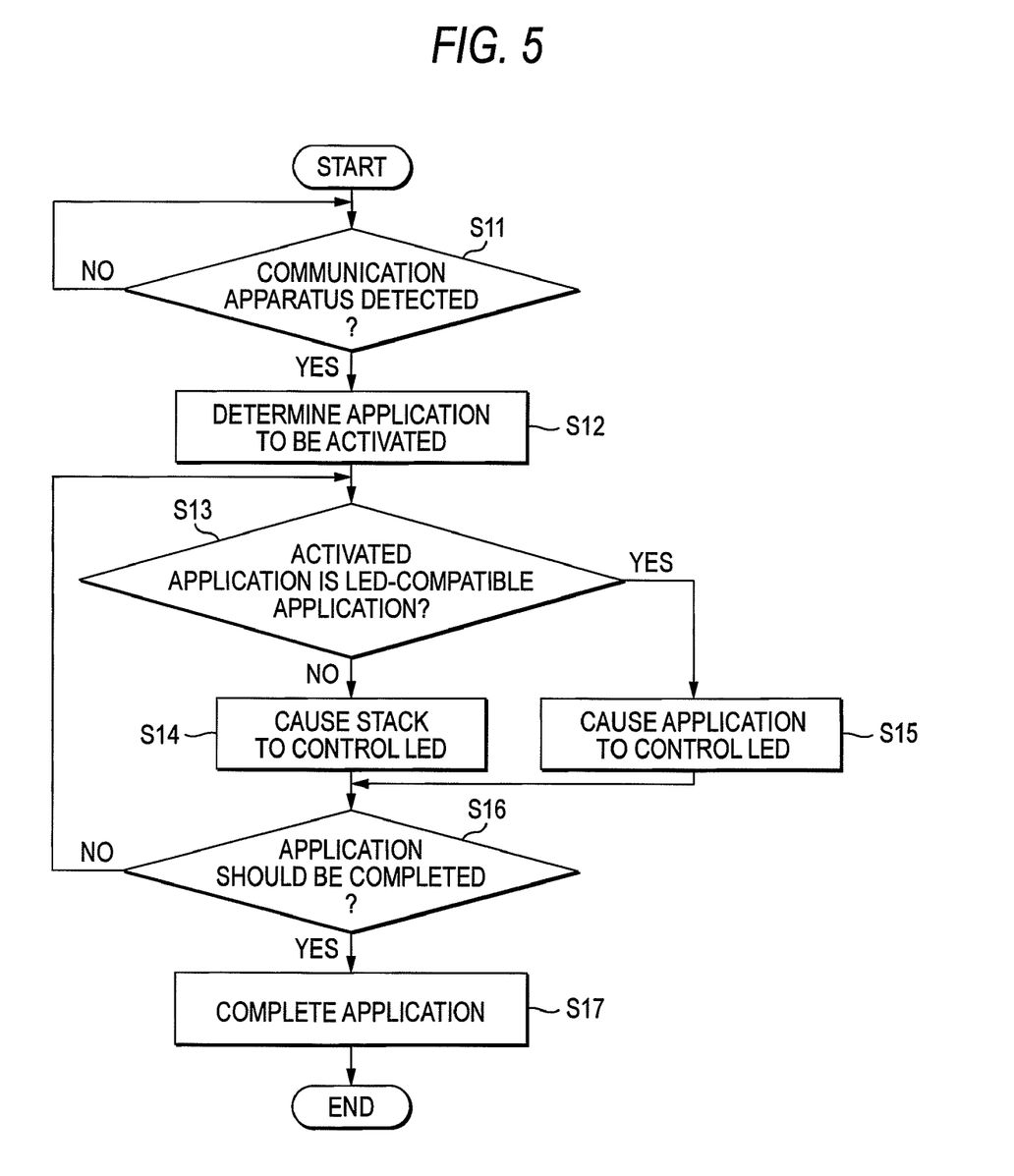
FIG. 5 is a flowchart showing an LED control process according to the exemplary embodiment.

FIG. 5 is a flowchart showing an LED control process according to the exemplary embodiment. First, at step S11, the CPU 14 determines whether or not the communication module 8 detects the communication apparatus 11. The CPU 14 may determine that the communication apparatus 11 is detected when the communication apparatus 11 has entered a communication range of the communication module 8 or a reply signal is received from the communication apparatus 11 in response to a connection request signal sent from the communication module 8.

If it is determined that the communication apparatus 11 is not detected (No at step S11), the process returns to step S11. On the other hand, if it is determined that the communication module 8 detects the communication apparatus 11 (YES at step S11), at step S12 the CPU 14 determines an application to be activated. That is, the CPU 14 activates, by referring to the database 103, an application that is suitable for the communication apparatus 11 that is detected at step S11.

At step S13, the CPU 14 determines whether the activated application is the LED-compatible application 101 or not. The CPU 14 determines whether or not the activated application is the LED-compatible application 101 by watching whether or not the activated application accesses the LED I/F application 10.

If it is determined that the activated application is not the LED-compatible application 101 (NO at step S13), at step S14 the CPU 14 causes the stack 100 to control the LED 9. More specifically, the CPU 14 performs a control of the LED 9 by sending a control signal from the stack 100 to the LED I/F application 10 according to data communication performed by the stack 100.

On the other hand, if it is determined that the activated application is the LED-compatible application 101 (YES at step S13), at step S15 the CPU 14 causes the LED-compatible application 101 to control the LED 9. More specifically, the CPU 14 performs a control of the LED 9 by sending a control signal from the LED-compatible application 101 to the LED I/F application 10 according to the wireless communication performed by the communication module 8.

At step S16, the CPU 14 determines whether to complete the activated application. If it is determined that the activated application should not be completed (NO at step S16), the process returns to step S13. On the other hand, if it is determined that the activated application should be completed (YES at step S16), at step S17 the CPU 14 completes the activated application. Then, the LED control process is completed.

According to the above-described exemplary embodiment, when the wireless communication is performed, the LED 9 can be controlled uniformly irrespective of whether the type of an application that is activated according to the communication apparatus 11. That is, it is possible to notify the user of the communication status of the wireless communication when the wireless communication is performed with any of various kinds of communication apparatus 11. The LED 9 allows the user to recognize the start and the end of the wireless communication.

Although in the exemplary embodiment the user is notified of the start and the end of the wireless communication by means of the LED 9, the invention is not limited to such a case. For example, the user may be notified of a period during the wireless communication is performed by means of a sound that is output from speakers.

Although the exemplary embodiment according to the present invention has been described above, the present invention is not limited to the above-mentioned exemplary embodiment but can be variously modified.

Additional advantages and modifications will readily occur to those skilled in the art. Therefore, the invention in its broader aspects is not limited to the specific details and representative exemplary embodiments shown and described herein. Accordingly, various modifications may be made without departing from the spirit or scope of the general inventive concept as defined by the appended claims and their equivalents.

What is claimed is:

1. An information processing apparatus comprising:
a wireless communication module configured to connect to a counterpart apparatus via wireless communication;
a memory configured to store a first application and a plurality of second applications, the first application configured to allow the information processing apparatus to transmit data to the counterpart apparatus and to receive data from the counterpart apparatus through the wireless communication, and the plurality of second applications being in a higher application-level than the first application;
a controller configured to activate one of the plurality of second applications associated with the counterpart apparatus; and
an indicator indicative of a status of the wireless communication,
wherein the controller is configured to determine whether the activated second application is allowed to access the indicator, and
wherein the controller is configured to control the indicator to indicate the status of the wireless communication based on the activated second application when the controller determines that the second application is allowed to access the indicator, and to control the indicator to indicate the status of the wireless communication based on the first application when the controller determines that the second application is not allowed to access the indicator.

2. The apparatus of claim 1, wherein the first application allows the controller to control the indicator according to the data communication.

3. The apparatus of claim 1, wherein the second application allows the controller to control the indicator according to the wireless communication.

4. The apparatus of claim 2, wherein the first application allows the information processing apparatus to turn on the indicator when the first application allows the wireless communication module to start the data communication, and allows the information processing apparatus to turn off the indicator when the wireless communication module completes the data communication based on the first application.

5. The apparatus of claim 3, wherein the second application granted access the indicator allows the controller to turn on the indicator when the wireless communication module starts the wireless communication, and allows the controller to turn off the indicator when the wireless communication module completes the wireless communication.

6. The apparatus of claim 4, wherein the first application allows the controller is configured to blink the indicator during the data communication by the first application.

7. The apparatus of claim 5, wherein the second application configured to access the indicator is configured to blink the indicator during the wireless communication.

8. The apparatus of claim 1, wherein the plurality of the second applications and a plurality of counterpart apparatuses are associated and stored as a database with identifiers of the plurality of the counterpart apparatuses as keys.

9. The apparatus of claim 8, wherein the controller is configured to activate the second application associated with the counterpart apparatus by referring to the database.

10. The apparatus of claim 8, wherein each second application is associated with each counterpart apparatus upon a start of the wireless communication with each counterpart apparatus.

11. A wireless communication system for a plurality of kinds of data, the system comprising:
   an information processing apparatus comprising:
      a first wireless communication module configured to couple with a communication apparatus via wireless communication;
      a memory configured to store a communication application, and a plurality of secondary applications in a higher application-level than the communication application, the communication application comprising a transmitter module comprising instructions to transmit data via the wireless communication and a receiver module comprising instructions to receive data via the wireless communication;
      a controller configured to execute one of the plurality of secondary applications; and
      an indicator indicative of a status of the wireless communication, and
   a communication apparatus associated with one of the plurality of the secondary applications, and configured to receive a command from the information processing apparatus and to transmit at least one of the plurality of kinds of data corresponding with the one of the plurality of the secondary applications via the wireless communication;
   wherein the controller is configured to determine whether the executed secondary application comprises an indicating module comprising instructions for controlling the indicator, and
   wherein the controller is configured to control the indicator based on the instructions of the indicating module of the secondary application if the controller determines that the secondary application comprises the indicating module, and to control the indicator based on the instructions of the communication application if the controller determines that the secondary application does not comprise the indicating module.

12. The wireless communication system of claim 11, wherein the communication apparatus comprises an apparatus identifier unique to the communication apparatus, and
   wherein the information processing apparatus is configured to associate the secondary application and the communication apparatus with the apparatus identifier and store the association in a correspondence table in the memory.

13. A method of wireless communication of a plurality of kinds of data for an information processing apparatus, the method comprising:
   coupling with a communication apparatus via wireless communication;
   storing a communication application for wirelessly communicating the plurality of data with a communication apparatus, and a plurality of secondary applications associated with the plurality of data, the communication application comprising a transmitter module comprising instructions to transmit data via the wireless communication and a receiver module comprising instructions to receive data via the wireless communication;
   executing one of the plurality of secondary applications;
   indicating a status of the wireless communication on an indicator;
   determining whether the executed secondary application comprises instructions for controlling the indicating;
   controlling the indicator based on the instructions of the secondary application if the controller determines that the secondary application comprises the instructions for controlling the indicating; and
   controlling the indicator based on the instructions of the communication application if the controller determines that the secondary application does not comprise the instructions for controlling the indicating.

14. The method of claim 13, wherein the communication apparatus comprises an apparatus identifier unique to the communication apparatus, the method comprising:
   associating the secondary application and the communication apparatus with the apparatus identifier; and
   storing the association in a correspondence table.

15. The method of claim 13, wherein the indicating based on the instructions of the communication application is according to a status of the data communication.

16. The method of claim 13, wherein the indicating based on the instructions of the secondary application is according to the status of the wireless communication.

17. The method of claim 15, further comprising:
   turning on the indicator when starting the data communication based on the instructions of the communication application; and
   turning off the indicator when completing the data communication based on the instructions of the communication application.

18. The method of claim 16, further comprising:
   turning on the indicator when starting the wireless communication based on the instructions of the secondary application; and
   turning off the indicator when completing the wireless communication based on the instructions of the secondary application.

19. The method of claim 17, further comprising:
   blinking the indicator during the data communication based on the instructions of the communication application.

20. The method of claim 18, further comprising:
   blinking the indicator during the wireless communication based on the instructions of the secondary application.

21. An information processing apparatus comprising:
- a wireless communication module configured to execute wireless communication;
- an indicator configured to indicate a communication status according to the wireless communication executed by the wireless communication module;
- an application corresponding to a counterpart communication apparatus of the wireless communication executed by the wireless communication module; and
- a controller configured to control the indicator based on the application when the application corresponding to the counterpart communication apparatus is allowed to access to the indicator and to control the indicator based on a communication control module which level is lower than the application when the application is not allowed to access to the indicator.

22. The apparatus of claim 21, wherein the application controls the indicator in accordance with data communication executed with the communication control module.

23. The apparatus of claim 21, wherein the communication control module accessible to the indicator controls the indicator in correspondence to the wireless communication executed by the wireless communication module.

24. The apparatus of claim 21, wherein the application turns on the indicator when data communication with the communication control module is started and turns off the indicator when the data communication with the communication control module is completed.

25. The apparatus of claim 21, wherein the communication control module accessible to the indicator turns on the indicator when the wireless communication module starts the wireless communication and turns off the indicator when the wireless communication module completes the wireless communication.

26. The apparatus of claim 21, wherein the application blinks the indicator during a period where data communication with the communication control module is executed.

27. The apparatus of claim 21, wherein the communication control module accessible to the indicator blinks the indicator during a period where the wireless communication module executes the wireless communication.

28. A method of wireless communication comprising:
- a step of executing wireless communication by a wireless communication module,
- wherein an indicator which indicates a communication status according to the wireless communication executed by the wireless communication module is controlled by an application which is corresponding to a counterpart communication apparatus when the application is allowed to access to the indicator, and
- wherein the indicator is controlled by a communication control module which level is lower than the application when the application is not allowed to access to the indicator.

* * * * *